May 14, 1929.   H. GARBADE   1,713,492
SAFETY MECHANISM FOR MOTOR CARS
Filed Jan. 4, 1928
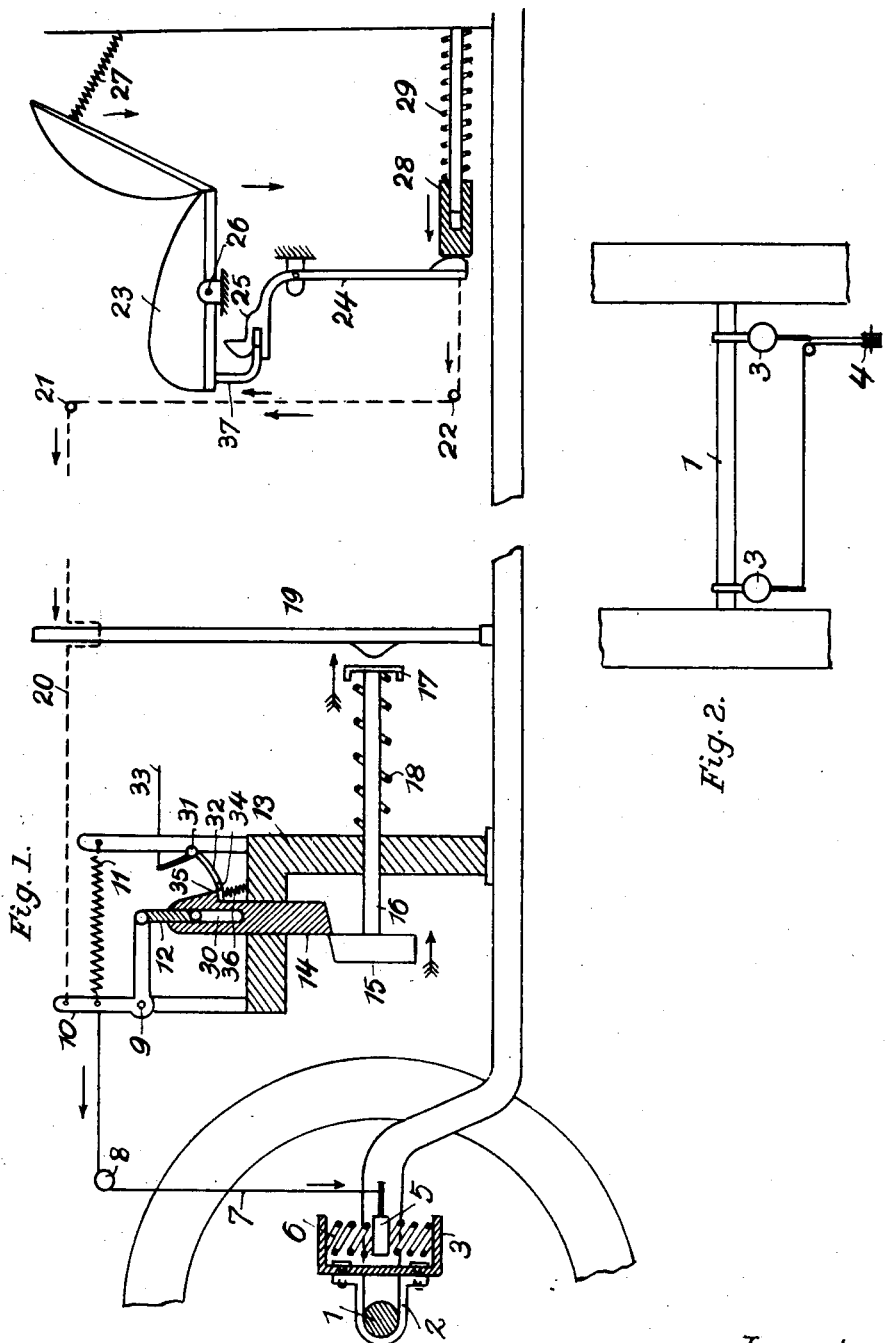

Patented May 14, 1929.

1,713,492

UNITED STATES PATENT OFFICE.

HEINRICH GARBADE, OF OLDENBURG, GERMANY.

SAFETY MECHANISM FOR MOTOR CARS.

Application filed January 4, 1928, Serial No. 244,466, and in Germany December 3, 1927.

This invention has for its object to ensure the instantaneous operation of wheel-brakes and to make at the same time the seats tip back, when a vehicle is striking against an obstacle or, when a vehicle is likewise brought out of the correct position, for instance, when a front-wheel is running up on the edge of the foot-path.

With this object in view spring-supported masses are provided and adapted to recoil so that they operate lever-mechanisms which act directly or indirectly, mechanically or electrically on the brake and on the tippable seats so that the brakes are automatically applied and the seats tip backward.

The devices can be constructed so that they operate as soon as a shock exceeds a certain strength.

It is evident that at a collision of any kind the driver of the vehicle, even when he is not injured and attempts at once to brake the vehicle, will lose several seconds, while according to the invention the brakes are automatically operated at the danger-moment.

The invention is specially important in cases, when at a collision the driver of the vehicle is injured.

An embodiment of the invention is illustrated diagrammatically, by way of example, in the accompanying drawing, in which:—

Fig. 1 is a side-elevation partly in section, showing the mechanism for tipping the seats on enlarged scale, Fig. 2 shows in top-plan-view the two spring-relays, arranged on the front-wheel-axle.

On the front-wheel-axle 1 stayed by two front-stays 2 of the carriage-frame, two spring relays 3 united at point 4 are mounted. The mass 5 of each relay 3 is suspended between springs 6. When the vehicle strikes against an obstacle as for instance the edge of the foot-path, the mass 5 in each relay recoils and an arm extending from the mass pulls a rope 7 in the direction of the arrow, which is guided over a pulley 8, said rope exerting a pull onto an elbow lever 10 pivotally mounted on a pivot axle 9 so that this lever oscillates against the action of a spring 11. The elbow lever 10 is connected by a slidable element 12 to a piston 14 in such a manner, that this piston is lifted at the oscillation of the lever 10 and releases a piston 15 which, under the action of a strong spiral spring 18 wound around a rod 16 of the piston, throws an abutment 17 against the brake lever 19 so that this lever is oscillated and the brakes are applied instantaneously.

The mechanism may be used also for operating the engine switch to stop the engine.

The elbow lever 10 is further connected by a rope 20 guided over pulleys 21, 22 with the seat 23 through the intermediary of a two armed lever 24, 25. The fork-shaped upper end 25 of the lever grips over the seat support 37.

When the mechanism is operated, the seat support 37 is liberated and the seat is tipped back instantaneously under the action of a pull spring 27.

The tipping movement of the seat might also be produced, independently of the two spring-relays arranged on the front axle of the car, in case the car should be suddenly strongly braked by hand by the mass 28 of a spring-relay arranged in the rear part of the car. This mass 28 acts upon the lower end of the two-armed levers 24, 25 and makes the same oscillate. A spring 29 serves to return the mass 28 into its normal position.

When the seat is being returned into its normal position, the seat support 37 comes automatically into engagement with the fork-shaped end of the arm 25 of the two-armed lever.

The movable masses of the spring-relays return automatically into their normal positions.

In order to make the piston 15, rod 16 and abutment 17 ready for use, and to compress the spring 18 the different elements are pushed back by means of the brake lever 19 so that, owing to the inclined contact-surfaces of the pistons 15 and 14, the piston 15 slides to a position behind the piston 14. With this object in view a longitudinal slot 30 is provided in the piston 14 so that this piston can give way under the pressure exerted upon it by the pin 15.

For applying the brake without the assistance of the two spring-relays 3 by hand, a lever 32 is pivotally mounted on a pivot pin 31 fixed on the frame 13 of the car. A rope 33 attached to the upper end of the vertical arm of said lever 32 serves to exert a pull on this lever so that a hingedly mounted nose 34 at the end of the lower arm of the lever, gripping under a nose 36 of the operating piston 14, lifts this piston 14 to release the piston 15. A spring 36 maintains the lever 32 in the normal position.

I claim:—

1. A mechanism for the instantaneous applying of the wheel brakes in emergency cases, independently of the driver, comprising in combination two spring-relays mounted on the front wheel axle and consisting each of a heavy mass mounted between two strong springs, a lever mechanism for operating the brake lever, and a rope connecting the heavy masses with said mechanism.

2. A mechanism as claimed in claim 1, comprising in combination with the spring-relays, a pivotally mounted spring-controlled elbow lever, a pull rope attached to the heavy mass in the spring-relays and to the vertical arm of said elbow lever, a piston suspended on the end of the horizontal arm of said elbow lever, a shock-exerting device held in the position ready for use by said piston, and a strong pressure spring on said shock exerting device for pushing the same against the brake lever as soon as said piston is lifted and releases said device.

3. A mechanism as claimed in claim 1, comprising in combination with the spring-relays, a pivotally mounted spring-controlled elbow lever, a pull rope attached to the heavy mass in the spring-relays and to the vertical arm of said elbow lever, a piston suspended on the end of the horizontal arm of said elbow lever, a shock-exerting device held in the position ready for use by said piston, a strong pressure spring on said shock-exerting device for pushing the same against the brake lever as soon as said piston is lifted and releases said device, and a mechanism for tipping the seat at the automatic application of the wheel brakes consisting of a pull spring attached to the back of the pivotally mounted seat, a support of said seat, a vertical two-armed lever pivotally mounted, a fork-shaped end of the upper arm of said lever engaging over said seat support, a pull rope attached to the lower end of said two armed lever and at the other end to the upper end of the vertical arm of said elbow lever of the brake-operating mechanism, and guide pulleys for guiding said pull rope.

In testimony whereof I affix my signature.

HEINRICH GARBADE.